(12) United States Patent
Nolterieke et al.

(10) Patent No.: US 8,604,926 B2
(45) Date of Patent: Dec. 10, 2013

(54) AUTOMATIC VERIFICATION OF NETWORK CABLE CONNECTIONS

(75) Inventors: Michael H. Nolterieke, Raleigh, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 12/778,282

(22) Filed: May 12, 2010

(65) Prior Publication Data

US 2011/0279266 A1    Nov. 17, 2011

(51) Int. Cl.

| G08B 21/00 | (2006.01) |
|---|---|
| G08B 23/00 | (2006.01) |
| G08B 1/08 | (2006.01) |
| H04L 12/26 | (2006.01) |
| H04L 12/28 | (2006.01) |
| H04J 3/16 | (2006.01) |
| G06F 15/173 | (2006.01) |
| G06F 15/16 | (2006.01) |

(52) U.S. Cl.
USPC ........... 340/540; 340/502; 340/533; 340/534; 340/686.1; 340/687; 370/245; 370/395.3; 370/471; 709/223; 709/224; 709/227; 709/239

(58) Field of Classification Search
USPC .................................................. 340/540, 687
See application file for complete search history.

(56) References Cited

U.S. PATENT DOCUMENTS

| 4,246,442 A * | 1/1981 | Hashimoto | 379/93.01 |
|---|---|---|---|
| 4,964,120 A * | 10/1990 | Mostashari | 370/228 |
| 5,170,113 A * | 12/1992 | Albonesi | 324/66 |
| 5,448,574 A * | 9/1995 | Yamaguchi | 714/712 |
| 5,678,005 A * | 10/1997 | Taylor | 709/224 |
| 6,285,293 B1 * | 9/2001 | German et al. | 340/687 |
| 6,381,643 B1 * | 4/2002 | Bartfai et al. | 709/224 |
| 6,931,475 B2 * | 8/2005 | Huang et al. | 710/316 |
| 7,065,548 B2 | 6/2006 | van Oldenborgh et al. | |
| 7,619,981 B2 * | 11/2009 | Bomhoff et al. | 370/244 |
| 7,857,222 B2 * | 12/2010 | Kosecki et al. | 235/462.15 |
| 7,908,368 B2 * | 3/2011 | Strole | 709/224 |
| 2004/0264422 A1 * | 12/2004 | Calcev et al. | 370/338 |
| 2005/0060413 A1 | 3/2005 | Oyadomari et al. | |

(Continued)

OTHER PUBLICATIONS

IBM, "Detection of Connection Status for Devices in a Daisy Chain", Document No. IPCOM000013232D, May 6, 2001, 3 pages.

(Continued)

*Primary Examiner* — Daniel Wu
*Assistant Examiner* — Muhammad Adnan
(74) *Attorney, Agent, or Firm* — Cynthia G. Seal; Jeffrey L. Streets

(57) ABSTRACT

A system and method for guiding server chassis enumeration in a computer system are disclosed. One embodiment provides a method of connecting a plurality of computer server chassis configured as a plurality of nodes. For each cable connection between any two server chassis, a port on the first of the two server chassis to which a first end of a cable is connected is identified, and a port on the second server chassis to which a second end of the cable is connected is identified. The node containing second server chassis is uniquely designated by the port designator on the first server chassis, and the node containing the first server chassis is uniquely designated by the port designator on the second server chassis. An electronic alert is generated in response to any conflicting node designator.

19 Claims, 4 Drawing Sheets

(56) References Cited

U.S. PATENT DOCUMENTS

| | | |
|---|---|---|
| 2005/0196124 A1 | 9/2005 | Aldereguia et al. |
| 2005/0201292 A1 | 9/2005 | Bomhoff et al. |
| 2005/0229173 A1* | 10/2005 | Mihm et al. ............ 717/171 |
| 2005/0261026 A1 | 11/2005 | Hausman et al. |
| 2006/0156294 A1 | 7/2006 | Fuller, III et al. |
| 2006/0168182 A1 | 7/2006 | Fuller, III et al. |
| 2008/0244281 A1 | 10/2008 | Felter et al. |
| 2008/0259816 A1 | 10/2008 | Archer et al. |
| 2008/0310421 A1 | 12/2008 | Teisberg et al. |
| 2009/0045922 A1* | 2/2009 | Kosecki et al. ............ 340/10.3 |
| 2009/0063662 A1 | 3/2009 | Baker et al. |

OTHER PUBLICATIONS

IBM, "Network Helper", Document No. IPCOM000114550D, Mar. 29, 2005, 4 pages.

IBM, "A Method of Visual Partitioning Cable Identification and Diagnostics (Cable Lightpath)", Document No. IPCOM000126976D, Aug. 16, 2005, 3 pages.

* cited by examiner

AUTOMATIC VERIFICATION OF NETWORK CABLE CONNECTIONS

BACKGROUND

1. Field of the Invention

The present invention relates to network connections in computer systems, and more particularly to guiding cable connections between multiple server chassis of a computer system.

2. Background of the Related Art

Large, sophisticated computer systems are often formed by interconnecting a plurality of smaller computer systems to combine the computing resources of the smaller computer systems. For example, a multi-blade server chassis may provide the combined computing resources of a plurality of blade servers in the server chassis. Multiple server chassis may be supported on racks to form even larger computer systems. A datacenter may include numerous equipment racks on which a large number of server chassis are supported. A large computer system comprised of multiple server chassis typically requires numerous, very specific cable connections to achieve the desired system configuration. The large number of very specific cable connections required creates the risk of human error, even in the hands of a knowledgeable system installer.

BRIEF SUMMARY

One embodiment of the present invention provides a method for guiding network cabling of multiple chassis. The sequential connection of a plurality of communication cables between network ports on a plurality of server chassis is monitored. For each connection of a cable between a first and second of any two server chassis, a fixed-value port designator of a port on the first server chassis is determined and a fixed-value port designator of a port on the second server chassis is determined. The node of the first server chassis is then uniquely designated according to the port designator on the second server chassis and the node of the second server chassis is uniquely designated according to the port designator on the first server chassis. Any conflicting node designator is identified and an electronic alert is automatically generated in response to the conflicting node designator. The method may be implemented by a computer program product including computer usable program code embodied on a computer usable storage medium, wherein the computer program product includes computer usable program code for performing the steps of the method.

Another embodiment of the invention provides a computer system including a first server chassis. The first server chassis includes a plurality of networking ports. Each networking port has a unique, fixed-value port designator to differentiate the networking ports on that first server chassis. A controller on the first server chassis is in electronic communication with the networking ports. The controller includes control logic for detecting the connection of one end of a cable to one of the networking ports and automatically communicating the port designator for that port along the cable in response to the detected connection. The controller further includes control logic for receiving another port designator from a port on a second server chassis and for assuming a node designator selected according to the another port designator.

DETAILED DESCRIPTION

One embodiment described herein is a method of guiding network cabling between multiple server chassis in a computer system. The method involves designating each server chassis as belonging to a particular node in a network of multiple server chassis according to network cable connections made between the multiple server chassis. Each node may include as few as one server chassis per node, although embodiments discussed below consider the more complex scenario wherein a network of server chassis comprises two or more chassis per supernode. An aspect of the method includes validating the cable connections during the course of making the cable connections. Embodiments of the invention are discussed in terms of an example system configuration having a total of eight server chassis interconnected as a four-node network, with two chassis per node (i.e. four two-chassis supernodes). However, the inventive aspects discussed herein may be applied to a network having any number of server chassis and any number of nodes, including larger computer systems with a greater number of server chassis and a greater number of cable connections to be made.

In one embodiment, a cable installation rule is applied by server chassis controllers when connecting a cable between two server chassis. A port designator (which may be a port number) on the first of the two server chassis is used to determine a supernode designator for the supernode containing the second of the two server chassis, and a port designator on the second of the two server chassis is used to determine a supernode designator for the supernode containing the first of the two server chassis. In that context, the nodes and the plurality of server chassis are said to be enumerated, one after another, according to the cable connections made between the multiple chassis. However, port designators and node designators are not required to be or include port numbers. An aspect of this embodiment involves cable validation, whereby an electronic alert is automatically generated in response to a cable connection that would violate the cable installation rule and cause conflicting server chassis designators.

Figure 1:
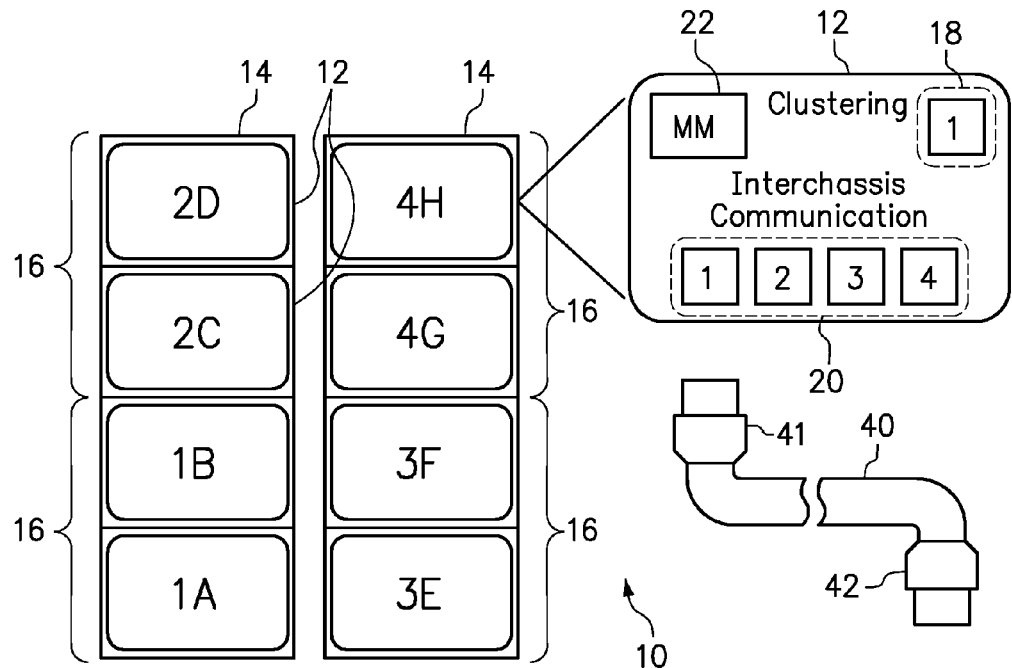
FIG. 1 is a diagram of a computer system having an example configuration of eight server chassis supported among two racks.

FIG. 1 is a diagram of a computer system 10 providing self-guided server chassis designation (e.g. enumeration) and cabling verification according to an embodiment of the invention. The computer system 10 includes eight server chassis 12 supported among two racks 14, with four server chassis 12 per rack 14. Each server chassis 12 may include multiple hot-swappable servers (not shown). The hot-swappable servers may be hot-swappable blade servers, which share chassis resources provided by hot-swappable support modules (not shown) that are also interconnected within each server chassis 12. The blade servers and support modules within each server chassis 12 may be interconnected, such as by plugging into an internal server chassis midplane or backplane that provides power and communication pathways between the various blade servers and support modules. As generally understood in the art, the support modules in a given server chassis 12 may include one or more power modules providing a shared power supply to the servers in the server chassis 12, blower modules for cooling the servers in the server chassis 12, and switch modules providing network connectivity to the servers in the server chassis 12.

A chassis management module 22 in each server chassis 12 includes a management processor uniquely associated with the chassis 12 to perform management tasks, such as managing a chassis power policy, monitoring temperatures, generating system alerts, and other systems management tasks at a chassis level. In this embodiment, the chassis management module 22 additionally cooperates to apply a cable installation rule to provide each server chassis with a supernode designator, such as to enumerate which of the four supernodes each server chassis 12 belongs to based on the ports to which cables are connected.

The eight server chassis 12 are to be networked by interconnecting the eight server chassis 12 in a very particular cabling arrangement, as guided by the chassis management modules 22. Each server chassis 12 has a physical interface that provides various connectors 18, 20 for physically connecting communication cables between the server chassis 12. The physical interface of each server chassis 12 may include any number of physical networking ports 18 for clustering with a corresponding number of server chassis to form a supernode. A supernode is a node comprising two or more chassis as members of the supernode. This example involves eight chassis 12 interconnected as four supernodes 16, with two chassis 12 per supernode 16. Thus, one physical networking port 18 per chassis 12 is provided for clustering each chassis 12 with one adjacent server chassis 12. A high-speed fabric may be used for clustering, although well-known connection types such as a fiberoptic or Ethernet connection may be suitable for clustering.

The physical interface further includes four other physical networking ports 20 (referred to herein as networking ports 20) for communication between the plurality of supernodes. Each cable 40 includes a first end 41 for connecting to one networking port 20 on one server chassis 12 and a second end 42 for connecting to another networking port 20 on another server chassis 12. As many cables 40 as necessary may be provided to interconnect the server chassis 12 to achieve the particular cabling configuration selected for the system 10. The chassis management module 22 on each server chassis 12 is capable of detecting when an end 41 of a cable 40 is connected to any of the networking ports 20 on that server chassis 12, even if the other end 42 of the cable 40 is not connected to a networking port 20 on any of the other server chassis 12.

The various server chassis 12 in the system 10 do not need to be imparted with any distinguishing physical characteristics to preordain the identity of one chassis 12 with respect to another chassis 12 in terms of where each chassis is to fit into the system. For example, all of the server chassis 12 may have the same physical interface, with identical positioning of ports 18, 20. All of the server chassis 12 may also be manufactured having the same code levels, and without requiring any software or hardware keying. Thus, the relationships between the various server chassis 12 in the system 10 are not dependent upon differences between the chassis 12, but upon the manner in which the chassis 12 are interconnected using cables. The desired system configuration requires the four even-lettered chassis to be fully meshed to each other, and the four odd-lettered chassis to be fully meshed to each other.

Although a system installer may be familiar with the desired cabling configuration, the number of different cable connections required to produce the fully cabled system creates potential for human error. In larger systems (e.g. in a sixteen server chassis, four-rack system), the potential for human error in achieving the very particular cabling configuration desired is even greater, due to a greater number of possible (correct or incorrect) cable connections. Various embodiments of the invention, therefore, are directed to methods of validating the cable connections by monitoring cable connections between the server chassis 12 and immediately alerting the installer in the event of violating the rule, indicating a cabling installation error.

For reference, each server chassis 12 in FIG. 1 is labeled with a numeral corresponding to the supernode 16 of which the server chassis 12 is a member, followed by a letter corresponding to the particular server chassis 12. Thus, Server chassis A and B belong to a first supernode ("Supernode 1"), Server chassis C and D belong to a second supernode ("Supernode 2"), Server chassis E and F belong to a third supernode ("Supernode 3"), and Server chassis G and H belong to a fourth supernode ("Supernode 4"). Because these labels (1A, 1B, 2A, etc.) are provided for reference in the figure, it is not necessary to actually display these labels on any of the server chassis 12. The chassis management module 22 is provided with logic for enforcing a cable installation rule to monitor the cable connections between the eight server chassis 12 using the networking ports 20. The cable installation rule is devised to achieve the very particular cabling configuration desired for the system 10. In the illustrated example configuration, each server chassis 12 in one supernode 16 is required to be connected to one server chassis 12 in each of the other three supernodes 16 using the connectors 20. In the illustrated 2-chassis supernodes, one chassis in each pair may be referred to as an odd-lettered chassis, while the other chassis in each pair may be referred to as an even-lettered chassis. Here, the chassis 12 labeled A, C, E, and G are defined as odd-lettered chassis, and the chassis labeled B, D, F, and H are defined as even-lettered chassis. The particular cabling configuration selected for the system 10 requires each odd-lettered server chassis (A, C, E, G) in one supernode 16 to be connected to each of the other odd-lettered server chassis, and requires each even-lettered server chassis (B, D, F, H) to be connected to each of the other even-lettered server chassis in the system 10. In a system having a greater number of chassis per supernode, an alternate designation may be used to distinguish between the chassis in a particular supernode. For example, in a three-chassis supernode, the three chassis may be distinguished as top/middle/bottom, primary/secondary/tertiary, or by some other distinction. By applying the cable installation rule, the chassis management modules 22 cooperate to designate each server chassis 12 in the system 10 as belonging to a particular supernode, in this case using a numerical supernode designator. Preferably, the chassis management modules 22 will cooperatively apply the cable installation rule to designate each server chassis as having an order designator, such as an odd-letter or even-letter designation in a configuration having two server chassis per supernode.

Stated one way, the cable installation rule in this embodiment is that for each cable connection made between a first port on a first server chassis and a second port on a second server chassis, a port designator of the first port determines the supernode designator of the supernode to which the second server chassis belongs, and a port designator of the second server chassis determines the supernode designator of the supernode to which the first server chassis belongs. Each port designator is uniquely selected for the port it designates within a given chassis, and has a fixed value. For example, each port may have a single, fixed port number. The port designators have fixed values permanently associated with the port, and are not to be confused with a variable number (e.g. an IP address would not be used as the port designator, since the value of an IP address may change). Application of this cable installation rule is illustrated by example in FIGS. 2-6.

Figure 2:
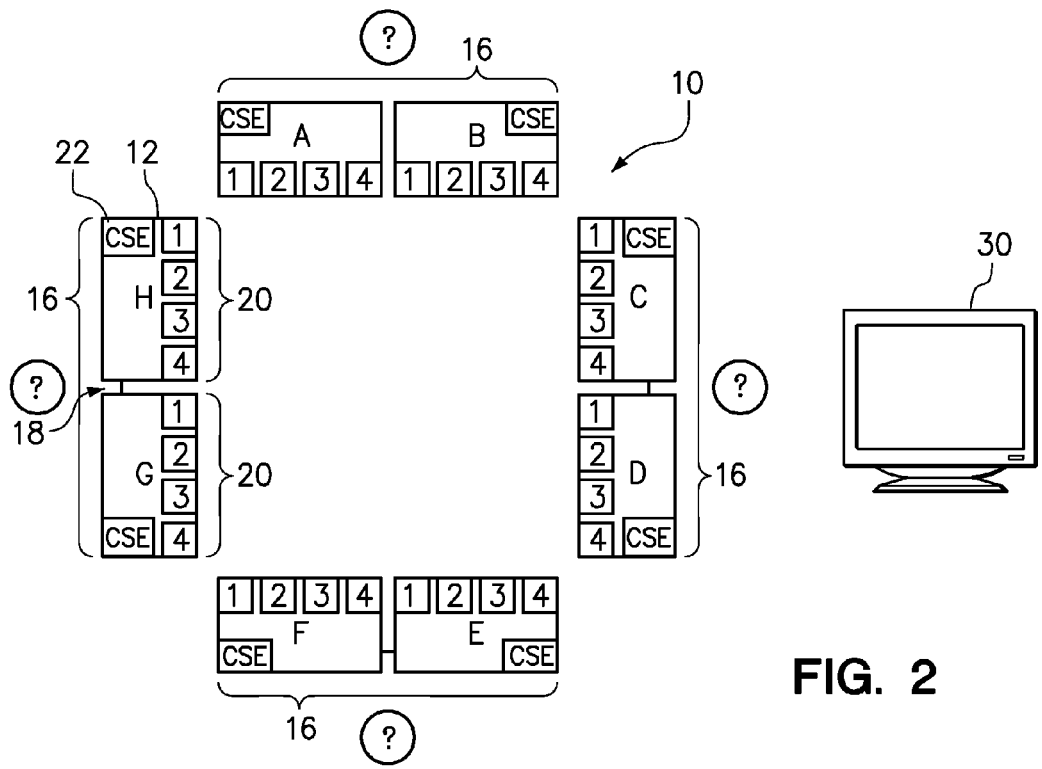
FIG. 2 is a schematic diagram of the computer system of FIG. 1 prior to making any cable connections between networking ports.

FIG. 2 is a schematic diagram of the computer system 10 wherein the eight server chassis 12 are clustered as four two-chassis supernodes 16, prior to interconnecting the networking ports 20. The positioning of the server chassis 12 in the schematic diagram facilitates discussion of the various connections to be made, and is not intended to represent the actual relative positioning of the server chassis 12. Because no cable connections have yet been made to the networking ports 20, the supernodes have not yet been designated.

The four supernodes 16 and the two server chassis 12 that comprise each supernode 16 may be designated in this embodiment by applying the cable installation rule to the cable connections made between the group of server chassis 12. The networking ports 20 on each server chassis 12 are designated as Port 1 to Port 4. In this example, the use of a single-digit port number (1 to 4) is sufficient to distinguish the four networking ports 20 on each chassis 12, and to subsequently enumerate each of four supernodes by supernode number (1 to 4). However, alternative port designators, alphanumeric or otherwise, may be used to uniquely designate each networking port 20.

The relative positioning of the networking ports 20 on each server chassis 12 and the relative positioning of the server chassis 12 in the racks 14 (see FIG. 1) may visually assist a technician making the connections between the networking ports 20 on the eight server chassis 12. The chassis management module 22 of each server chassis assists the installer by applying the cable installation rule and thereby provides a supernode designator to the server chassis according to which supernode each connected chassis 12 belongs. These designators are used by the system 10 to facilitate monitoring of the cable connections made, and to verify the cable connections by checking for any violations of the cable installation rule that indicate a cabling conflict. Thus, a technician may be alerted to an error in connecting a cable within the system 10 and may be assured that the particular cabling configuration for the system 10 is achieved in accordance with the cable installation rule.

Figure 3:
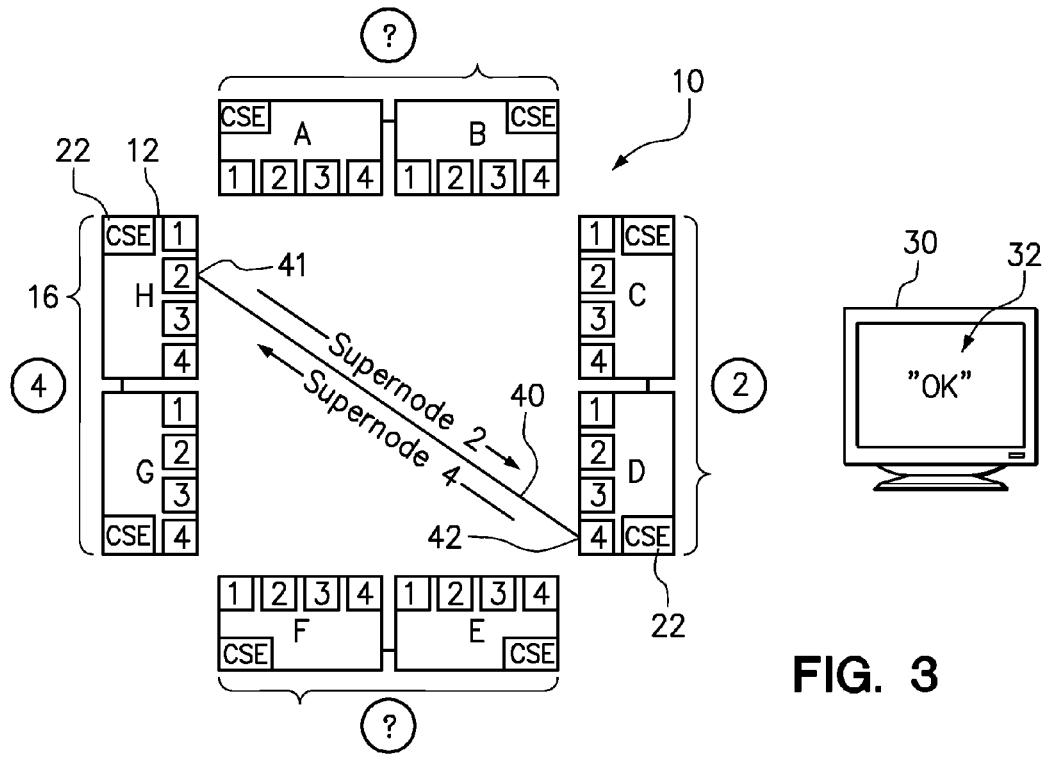
FIG. 3 is a schematic diagram of the computer system of FIG. 1, with a first example cable connection having been formed between two server chassis.

FIG. 3 is a schematic diagram of the computer system 10, with a first example cable connection having been formed from server chassis H to Server chassis D. A system installer may make the cable connection by physically connecting the first end 41 of the cable 40 to Port 2 of server chassis H and the second end 42 of the cable 40 to Port 4 of server chassis D. The chassis management module 22 of Server chassis H detects when the first end 41 of the cable 40 is connected to port 2. The chassis management module 22 of Server chassis D detects when the second end 42 of the cable 40 is connected to Port 4. The chassis management modules 22 of the respective server chassis D and H cooperate to provide supernode designators to the supernodes 16 to which each connected chassis 12 belongs by applying the cable installation rule selected for this system 10. Here, for example, Server Chassis H designates Server Chassis D as belonging to Supernode 2. To make this designation, Server Chassis H may communicate this supernode designator over the cable 40 from Server Chassis H to Server Chassis D. Likewise, Server Chassis D designates Server Chassis H as belonging to Supernode 4, such as by communicating this supernode designator over the cable 40 from the Server Chassis D to Server Chassis H.

The supernode designation may be generated by any component on the chassis sending the communication. When one end of the cable is connected to a networking port 20 of a chassis 12, the management module 22 on that chassis 12 or the networking port 20 itself may generate a chassis designator to be communicated over the cable 40 to another chassis when the other end of the cable 40 is connected to that other chassis. In the example of FIG. 3, in response to connecting the first end 41 of the cable 40 to Port 2 of Chassis H, Port 2 or some other component of Chassis H in communication with Port 2 may generate a signal to be transmitted from Port 2, along the cable 40, to Port 4 of Chassis D.

The foregoing provision of supernode designators (i.e., Chassis H belonging to Supernode 4 and Chassis D as belonging to Supernodes 2) are both valid here (i.e., there are no conflicting supernode designators being provided to a supernode). Both supernode designators are valid because there were no other previous cable connections present in the system and, therefore, no previous supernodes designations had been made. An electronic confirmation may be automatically generated and provided to the technician, such as by displaying a confirmation message 32 (e.g. "OK") on a console 30 or producing an audible alert, to indicate that a cabling conflict is not currently detected. In one embodiment, a red LED located on a chassis may ignite in response to receiving a conflicting designator and a green LED located on the chassis may ignite in response to a designator that does not cause a conflict.

Figure 4:
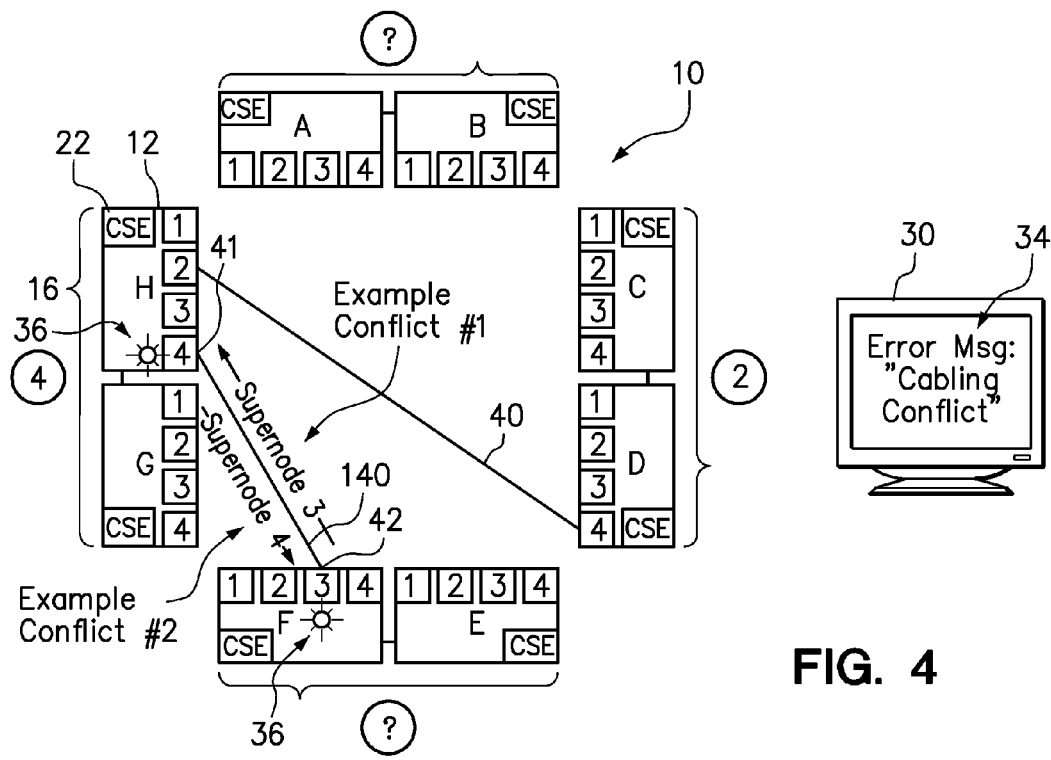
FIG. 4 is a schematic diagram of the computer system, wherein a cable connection presents two example cabling conflicts.

FIG. 4 is a schematic diagram of the computer system 10, wherein a subsequent connection using a second cable 140 in addition to the existing connection using the first cable 40 introduces two example cabling conflicts (example conflicts #1 and #2). The connection of the second cable 140 physically connects Port 4 of Server Chassis H with port 3 of Server Chassis F. Server Chassis F thereby designates Server Chassis H as belonging to Supernode 3, and Server Chassis H designates Server Chassis F as belonging to Supernode 4. Example conflict #1 is caused by Server Chassis F attempting to designate Server Chassis H as belonging to Supernode 3, which contradicts the existing supernode designation that Server Chassis G and H belong to Supernode 4. Because Server Chassis H has knowledge of its existing designation as a member of Supernode 4, Server Chassis H may identify example conflict #1. Example conflict #2 is caused by Server Chassis H attempting to designate Server Chassis F as belonging to Supernode 4, since the pair of Server Chassis G and H were previously designated as Supernode 4. Again, because Server Chassis H has knowledge of its existing designation as a member of Supernode 4, Server Chassis H may also identify example conflict #2. While Chassis H is capable of detecting both conflicts #1 and #2, Chassis H may share information with Chassis F along the connected cable 40, so that either Chassis H or F may identify the conflicts.

An electronic alert may be automatically generated in response to either or both of the example conflicts #1 or #2. One example of an electronic alert that may be automatically generated in response to example conflict #1 and #2 is an error message 34 displayed on the console 30. Another example of an electronic alert that may be automatically generated in response to example conflict #1 and #2 is an e-mail. The error message 34 or e-mail alert may identify the afflicted chassis (Chassis F and H) and the afflicted ports (Port 4 of Server Chassis H and Port 3 of Server Chassis F). Yet another example of an electronic alert that may be automatically generated in response to example conflict #1 and #2 is the illumination of an LED 36 uniquely associated with either or both of the afflicted ports.

It should be noted that the connection of the first cable 40 from Port 2 of Server Chassis H to Port 4 of Server Chassis D remains intact during the connection of the second cable 140, thus preserving the supernode designations made by virtue of connecting the first cable 40 as discussed in FIG. 3. In this embodiment, disconnecting at least one end of a cable previously connected between the networking ports of two chassis will remove the supernode designations previously made solely as a result of that cable connection. Here, the example cabling conflicts #1 and #2 may be resolved by disconnecting either cable 40, 140 from the afflicted ports. Disconnecting the first cable 40 would remove the supernode designations made by the connection of cable 40, or disconnecting the second cable 140 would remove the supernode designations made by the connection of the second cable 140, either of which obviates the particular cabling conflicts shown in FIG. 4.

When a conflict arises wherein an earlier-made ("senior") supernode designations and a subsequent ("junior") supernode designation contradict, the system 10 may defer to the senior supernode designations, even though both the junior and senior designations participate in the conflict and removal of either the junior or senior supernode designation may obviate the conflict. Thus, alerts may be generated that indicate the afflicted chassis and port of the junior supernode designation, but may also indicate the chassis and port of the senior supernode designation. To illustrate, in the example of FIG. 4, the senior supernode designation results from the connection of the first cable 40, and the junior supernode designation results from the subsequent connection of the second cable 140. Thus, Port 4 of Chassis H and Port 3 of Chassis F may be indicated as the afflicted ports, since those ports were involved in the junior supernode designation. However, Port 4 of Chassis D may also be indicated in an electronic alert, since removing the first cable 40 from Chassis D would also obviate the example conflicts #1 and 2.

Figure 5:
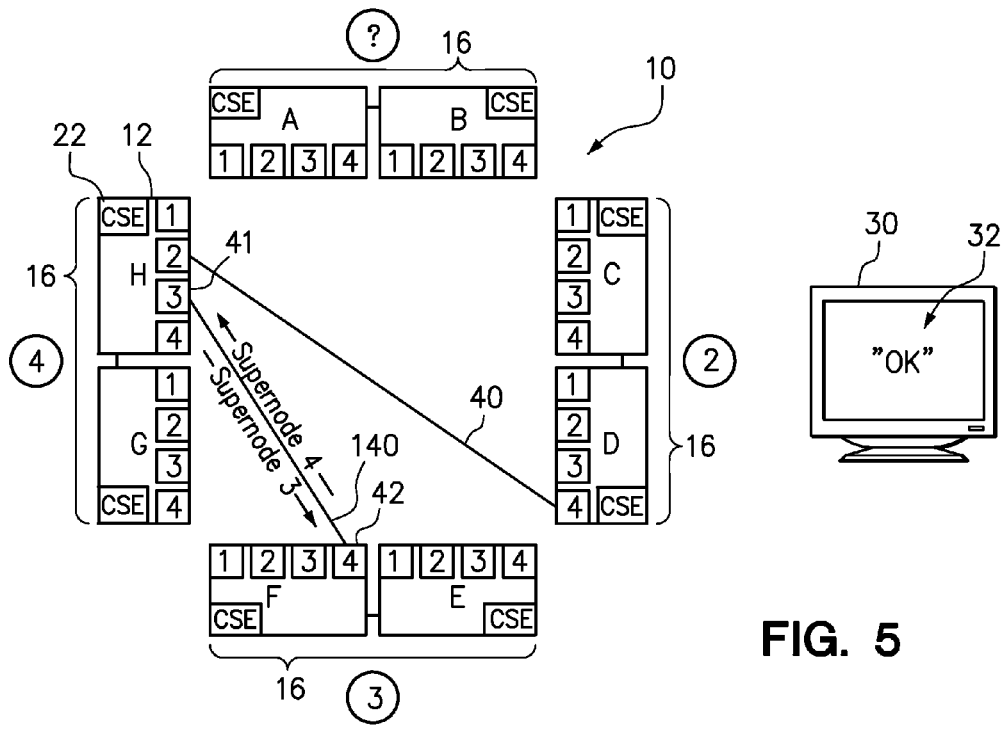
FIG. 5 is a schematic diagram of the computer system, wherein the example conflicts of FIG. 4 have been removed.

FIG. 5 is a schematic diagram of the computer system 10, wherein the example conflicts of FIG. 4 have been removed. The first end 41 of the cable 40 has been moved from Port 4 of Server Chassis H to Port 3 of Server Chassis H. The second end 42 of the cable 40 has been moved from Port 3 of Server Chassis F to Port 4 of Server Chassis F. This cable connection designates Server Chassis F as belonging to Supernode 3 and Server chassis H as belonging to Supernode 4. Neither of these supernode designators presents a conflict, and so the confirmation message 32 is displayed on the console 30. The confirmation (e.g. "OK") displayed on the console 30 indicates that a cabling conflict is not currently detected.

Figure 6:
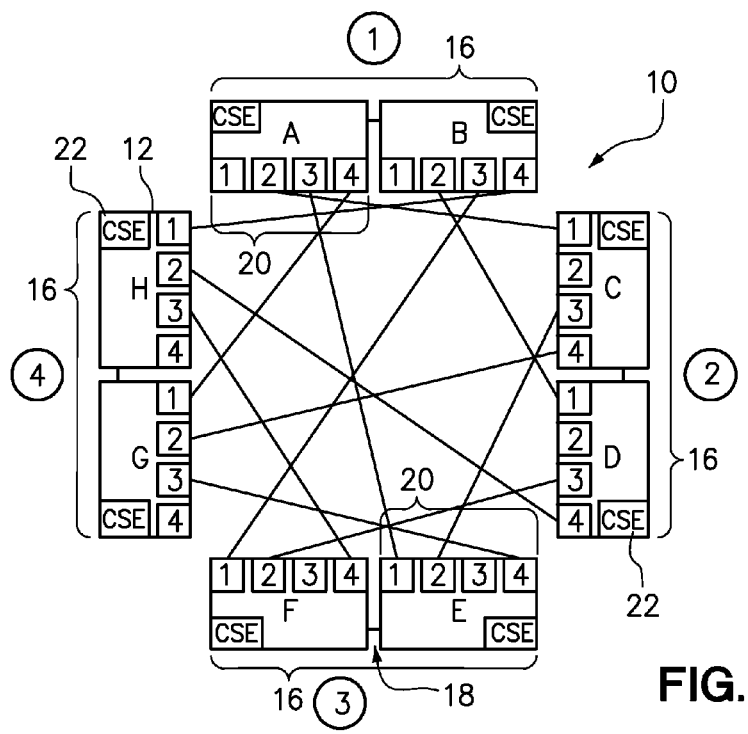
FIG. 6 is a schematic diagram of the computer system with the eight server chassis networked together, fully meshed, according to the cable installation rule.

FIG. 6 is a schematic diagram of the computer system 10 with the eight server chassis 12 networked together, fully meshed, according to the cable installation rule. Thus, for each cable connection between any two server chassis 12 of the system 10, the port designator on the first of the two server chassis uniquely designates the supernode containing the second of the two server chassis, and the port designator on the second of the two server chassis uniquely designates the supernode containing the first of the two server chassis, without any conflicting designators. In the fully cabled system, each server chassis in one supernode is connected to one of the two server chassis in each of the other supernodes.

Additionally, in this simple example having one even-lettered chassis and one odd-lettered chassis per supernode, each odd-lettered server chassis (A, C, E, G) in one supernode is connected to each of the other odd-lettered server chassis, and each even-lettered server chassis (B, D, F, H) is connected to each of the other even-lettered server chassis in the system 10. It is not necessary (and in the desired cabling configuration of the illustrated embodiment, it is prohibited) for the odd-lettered server chassis in one supernode 16 to be directly connected to the even-lettered chassis of another supernode, and vice-versa, since the connection made at the clustering ports 18 establishes communication between the odd-lettered and even-lettered chassis 12 in each supernode 16. Thus, for example, network traffic from Chassis A (odd-lettered) to Chassis E (odd-lettered) using network ports 20 can be communicated from Chassis E (odd-lettered) to Chassis F (even-lettered) over the connection at clustering ports 18, without the complication of having another cable directly connecting Chassis A to Chassis F.

Due to the lack of distinguishing physical characteristics of the chassis 12, there is no preordained identity of the various chassis as odd-lettered or even-lettered. Rather, the designation of each chassis 12 as even-lettered or odd-lettered is determined in the process of cabling the system 10. For example, a chassis 12 may default to odd-lettered (i.e. "odd") if it is the first chassis 12 in a particular supernode 16 to receive a cable connection to one of its networking ports 20. Then, the odd chassis having received the cable connection may communicate to the other chassis 12 in the supernode 16 that the other chassis 12 is even-lettered (i.e. "even"). A chassis having received a designation as odd may generate an alert in response to a subsequent cable connection attempting to designate that chassis as even, and vice-versa. Restricting an odd chassis to be connected by networking port to another odd chassis and an even chassis to be connected by networking port to another even chassis limits the number of physical networking connections between the various chassis 12 in the fully cabled system.

More generally, each chassis in a given supernode may be distinguished from the other chassis in that supernode according to an "order designator" indicating the order in which each chassis receives its first cable connection to a networking port. For example, in a three-chassis supernode, the first chassis to receive its first cable connection to one of its networking ports 20 may be designated as the first of three, the second chassis to receive its first cable connection to one of its networking ports 20 may be designated as being the second of the three chassis, and the third chassis to receive its first cable connection to one of its networking ports 20 may be designated as being the third of the three chassis. The order designators of "first," "second," and "third," may be indicated in a variety of alternative ways, such as using an alphanumeric order designator (e.g. 1, 2, 3 or A, B, C) that is separate from and in addition to the supernode designators discussed herein. According to the particular cabling configuration selected for a system, an alert may be generated in response to a chassis in one supernode being connected to a chassis in another supernode having a non-matching order designator. For example, in a system having three chassis per supernode, the first chassis in each supernode may only be connected to the first chassis in each other supernode, the second chassis in each supernode may only be connected to the second chassis in each other supernode, and the third chassis in each supernode may only be connected to the third chassis in each other supernode.

Figure 7:
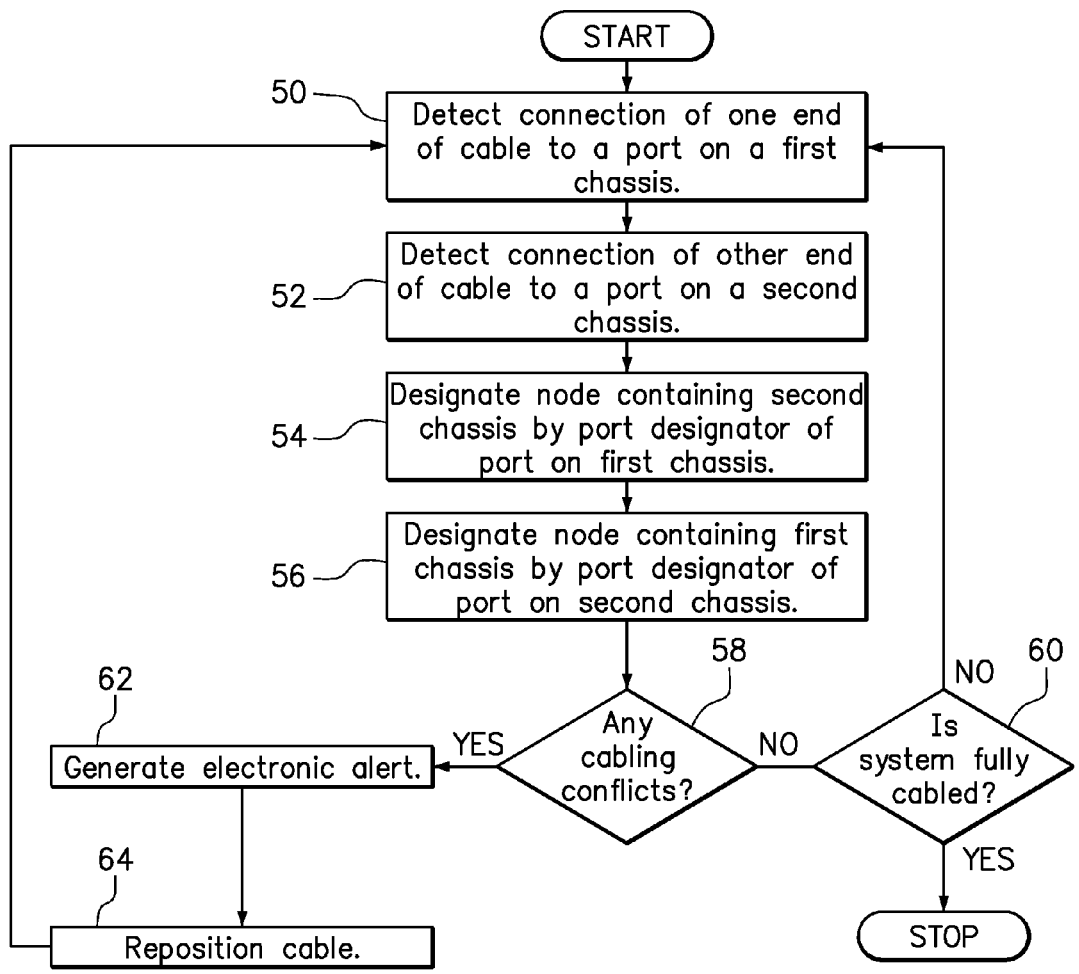
FIG. 7 is a flowchart of a method of guiding the cabling of a computer system.

FIG. 7 is a flowchart of a method of guiding the installation of cables in a computer system according to an embodiment of the invention. The cables are to be installed sequentially. For each cable installed between two server chassis, one end of the cable is connected to a port on a first server chassis and the other end of the cable is connected to a port on a second server chassis. Each connection may be completed by a technician physically plugging one end of a cable into the networking port on the first server chassis and physically plugging the other end of the cable into the networking port on the second server chassis. In step 50, the connection of one end of a cable to the first server chassis is detected. In step 52, the connection of another end of a cable to the second server chassis is detected. These connections may be detected, for example, by a chassis management module or other controller located on each of the respective server chassis.

A port designator is used to uniquely denote each port on a chassis, to distinguish the ports on that particular chassis. For example, on a server chassis having N ports, a port designator may be a fixed port number from 1 to N. Thus, on a server chassis having four ports, the ports may be uniquely designated with a single digit from 1 to 4; on a server chassis having eight ports, the ports may be designated with a single digit from 1 to 8; and so forth. The use of port numbers corresponding to the position of the connectors as arranged on the physical interface associates the port designator with its relative position in a group of ports. However, alternative designators may be used to identify ports, such as by more complex alphanumeric strings, e.g. serial numbers. However, fixed values such as port numbers are used for the port designators, rather than variable values such as an IP address associated with a port. According to step 54, a supernode containing the second server chassis is designated according to the port designator on the first server chassis. For example, the supernode to which the second server chassis belongs may be enumerated according to the port number on the first server chassis. Conversely, according to step 56, the supernode containing the first server chassis is designated according to the port designator on the second server chassis. For example, the supernode to which the first server chassis belongs may be enumerated according to the port number on the second server chassis.

Conditional step 58 is to determine whether a cabling conflict is present. If a cabling conflict is present, then an electronic alert is generated in step 60, and the cable may be manually repositioned in step 62, such as by moving one or both ends of the cable to different ports that do not present a cabling conflict. Examples of cabling conflicts are one supernode being given two different designators or two different supernodes being given the same designator as a result of applying the cable installation rule. If no cabling conflict is present in conditional step 58, then conditional step 60 is to determine whether the system is fully cabled. If the system is not fully cabled, then the next cable may be connected, returning to step 50. Otherwise, if the system is fully cabled in step 60, no further cable connections are to be made.

Cables are to be sequentially connected. With each cable connected between any two chassis, steps 50-56 are repeated for that cable. Thus, the technician is guided in the process of cabling a system, with each cable installed and each cable connection made between two chassis. Each cable connection between two chassis involves one end of a cable being connected to one port of one chassis and the other end of the cable being connected to one port of the other chassis. Each cable connection will result in the designation or attempted designation of the node to which each the connected chassis belongs. Then, the steps 58-62 are used to verify the connection made, such as to ensure no conflicts are present (step 58), to generate an alert if there is a conflict (step 60), and to correct the conflict (step 62).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    monitoring the sequential connection of a plurality of communication cables between network ports on a plurality of server chassis;
    for each connection of a cable between a first and second of any two server chassis, determining a fixed-value port designator of a first port on the first server chassis and a fixed-value port designator of a second port on the second server chassis and uniquely designating a node of the first server chassis according to the port designator of the second port on the second server chassis to which the first server chassis is connected and uniquely designating a second node of the second server chassis according to the port designator of the first port on the first server chassis to which the second server chassis is connected; and
    identifying a conflicting node designator and automatically generating an electronic alert in response to the conflicting node designator.

2. The method of claim 1, further comprising:
    configuring the nodes as supernodes, each supernode consisting of a plurality of server chassis.

3. The method of claim 2, further comprising:
    designating the plurality of chassis in each supernode using an order designator indicating the order in which each chassis in the supernode receives a first physical connection to one of its networking ports; and
    generating an alert if a chassis in one supernode is connected to a chassis in another supernode having a non-matching order designator.

4. The method of claim 1, wherein each port designator is a port number.

5. The method of claim 4, wherein the steps of uniquely designating the node of the first server chassis according to the port designator on the second server chassis and uniquely designating the node of the second server chassis according to the port designator on the first server chassis comprises assigning a node number to the second server chassis equal to the port number on the first server chassis and assigning a node number to the first server chassis equal to the port number on the second server chassis.

6. The method of claim 1, wherein identifying the conflicting node designator comprises identifying that one node has been given two different node designators.

7. The method of claim 1, wherein identifying the conflicting node designator comprises identifying that two different nodes have been given the same node designator.

8. The method of claim 1, wherein the step of automatically generating an electronic alert comprises:
    generating an alert message, generating an electronic mail message alert, or illuminating a light emitting diode.

9. The method of claim 1, wherein the step of generating an electronic alert comprises:
    illuminating an LED uniquely associated with the port on the first server chassis or an LED uniquely associated with the port on the second server chassis.

10. A computer system, comprising:
- a first server chassis including a plurality of networking ports, each networking port having a unique, fixed-value port designator to differentiate the networking ports on that first server chassis; and
- a controller on the first server chassis in electronic communication with the networking ports, the controller including control logic for detecting the connection of one end of a cable to one of the networking ports and automatically communicating the port designator for that port along the cable in response to the detected connection, the controller further including control logic for receiving another port designator from a port on a second server chassis, control logic for assuming a node designator selected according to the another port designator, and control logic for detecting a conflict and generating an alert in response to detecting that the node designator assumed by the first server chassis is the same as the node designator assumed by any other chassis connected to the first chassis not as a supernode.

11. The computer system of claim 10, further comprising:
one or more additional ports for clustering the server chassis with any other server chassis as a supernode.

12. The computer system of claim 10, further comprising control logic for detecting a conflict and generating an alert wherein the first server chassis has assumed two unequal node designators.

13. The computer system of claim 10, further comprising:
- an LED uniquely associated with each networking port on the first server chassis, each LED in electronic communication with the controller of the first server chassis; and
- control logic for illuminating an LED associated with a port subsequently receiving a node designator having a different value than the previously assumed node designator.

14. A computer program product including computer usable program code embodied on a non-transitory computer readable storage medium, the computer program product including:
- computer usable program code for monitoring the sequential connection of a plurality of communication cables between network ports on a plurality of server chassis;
- computer usable program code that, for each connection of a cable between a first and second of any two server chassis, determines a fixed-value port designator of a first port on the first server chassis and a fixed-value port designator of a second port on the second server chassis and uniquely designates a node of the first server chassis according to the designator of the second port on the second server chassis to which the first server chassis is connected and uniquely designates a second node of the second server chassis according to the port designator of the first port on the first server chassis to which the second server chassis is connected; and
- computer usable program code for identifying a conflicting node designator and automatically generating an electronic alert in response to the conflicting node designator.

15. The computer program product of claim 14, further comprising:
computer usable program code for configuring the nodes as supernodes, each supernode consisting of a plurality of server chassis.

16. The computer program product of claim 15, further comprising:
- computer usable program code for designating the plurality of chassis in each supernode using an order designator indicating the order in which each chassis in the supernode receives a first physical connection to one of its networking ports; and
- computer usable program code for generating an alert if a chassis in one supernode is connected to a chassis in another supernode having a non-matching order designator.

17. The computer program product of claim 15, wherein the computer usable program code for uniquely designating the node of the first server chassis according to the port designator of the second port on the second server chassis to which the first server chassis is connected and uniquely designating the second node of the second server chassis according to the port designator of the first port on the first server chassis to which the second server chassis is connected comprises computer usable program code for assigning a node number to the second server chassis equal to a port number on the first server chassis and assigning a node number to the first server chassis equal to a port number on the second server chassis.

18. The computer program product of claim 14, wherein computer the usable program code for identifying the conflicting node designator comprises computer usable program code for identifying that one node has been given two different node designators.

19. The computer program product of claim 14, wherein computer usable program code for identifying the conflicting node designator comprises computer usable program code for identifying that two different nodes have been given the same node designator.

* * * * *